(12) United States Patent
Schlueter

(10) Patent No.: US 8,023,566 B2
(45) Date of Patent: Sep. 20, 2011

(54) PERFORMING AND IMPLEMENTING A TEST TASK

(75) Inventor: Ismail Schlueter, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 1809 days.

(21) Appl. No.: 11/126,577

(22) Filed: May 10, 2005

(65) Prior Publication Data

US 2005/0254434 A1 Nov. 17, 2005

(30) Foreign Application Priority Data

May 11, 2004 (EP) .................................... 04011183

(51) Int. Cl.
*H04N 7/18* (2006.01)
(52) U.S. Cl. ............................ 375/240.26; 375/240.25
(58) Field of Classification Search . 375/240.25–240.26
See application file for complete search history.

(56) References Cited

U.S. PATENT DOCUMENTS

| | | | |
|---|---|---|---|
| 6,363,053 B1 | 3/2002 | Schuster et al. | |
| 6,512,988 B1 | 1/2003 | Kanago | |
| 6,661,780 B2 | 12/2003 | Li | |
| 7,489,706 B2 * | 2/2009 | Hatley et al. | 370/469 |
| 2001/0015732 A1 | 8/2001 | Ehrhardt et al. | |
| 2002/0162059 A1 | 10/2002 | McNeely et al. | |
| 2002/0191543 A1 | 12/2002 | Buskirk et al. | |
| 2003/0014611 A1 | 1/2003 | Ferris | |
| 2003/0086536 A1 | 5/2003 | Salzberg et al. | |
| 2003/0172342 A1 | 9/2003 | Elzur | |
| 2004/0048636 A1 | 3/2004 | Doble | |

OTHER PUBLICATIONS

Pradipta De et al, VirtualWire: "A Fault Injection and Analysis Tool for Network Protocols", Proceedings of 23rd ICDCS, May 19-22, 2003, Providence, RI.
Scott Dawson et al, "Experiments on Six Commercial TCP Implementations Using a Software Fault Injection Tool", Software—Practice & Experience, vol. 27(12), pp. 1385-1410.
Scott Dawson et al, "Fault Injection Experiments on Real-Time Protocols Using Orchestra", Proceedings, IEEE Nigara, Canada, pp. 142-149.

* cited by examiner

*Primary Examiner* — Andy S Rao
(74) *Attorney, Agent, or Firm* — Francis I. Gray; Michael J. Fogarty, III

(57) ABSTRACT

The present invention relates to a protocol tester and method for performing a test task relating to a specific protocol layer (E2) of a protocol stack in an apparatus to be tested where the specific protocol layer (E2) is superordinated to a higher-level protocol layer (E3) as a next higher protocol layer and is subordinated to a lower-level layer (E1) as a next lower layer. In the protocol tester there is inserted between the higher-level protocol layer (E3) and the lower-level layer (E1) a test layer into the protocol stack, the test layer in the protocol tester having the specific protocol layer (E2) and a complementary layer (ES).

20 Claims, 2 Drawing Sheets

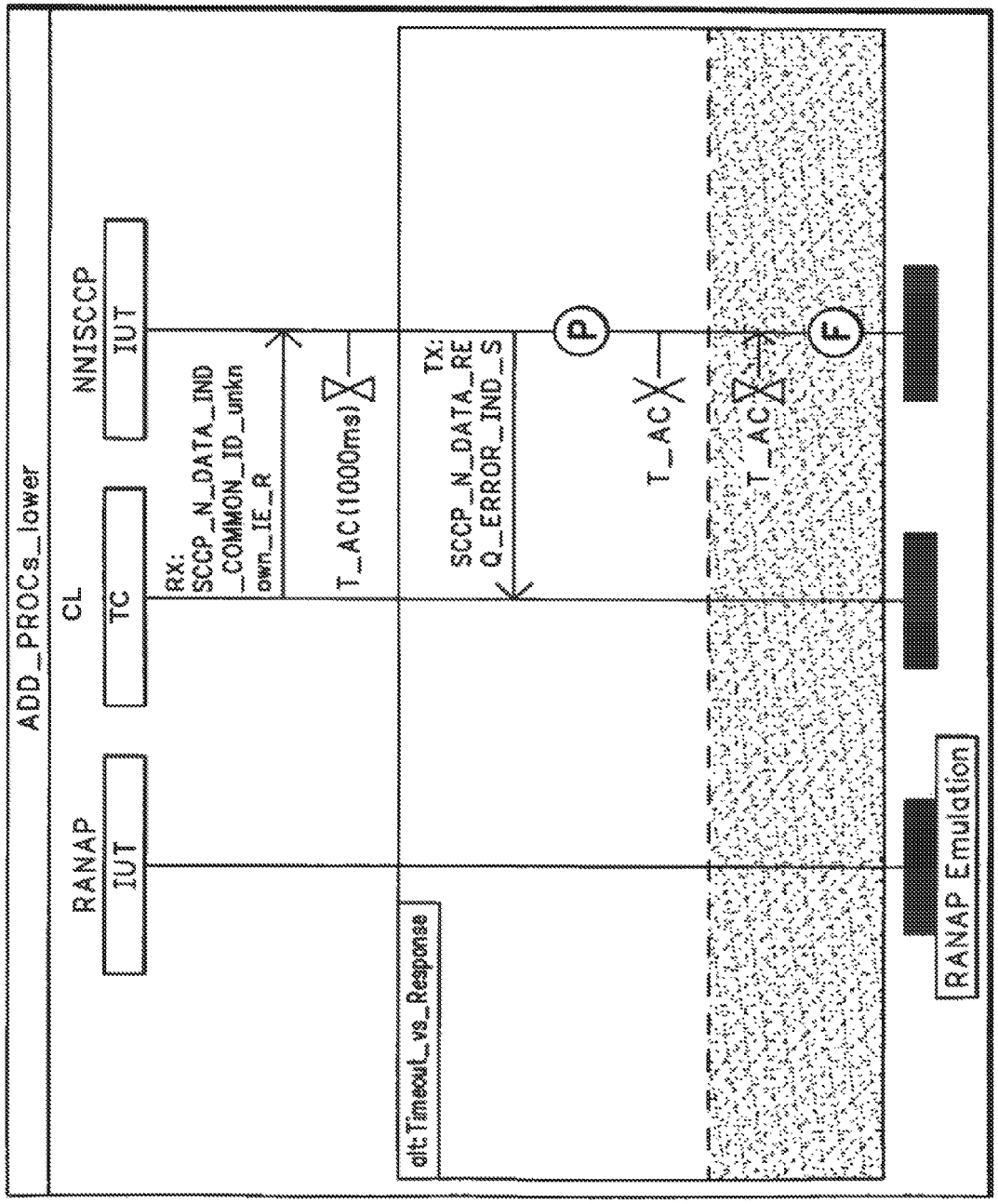

PERFORMING AND IMPLEMENTING A TEST TASK

BACKGROUND OF THE INVENTION

The present invention relates to protocol testing, and more particularly to performing and implementing a test task relating to a specific protocol layer of a protocol stack in an apparatus to be tested.

The field of protocol testing is a highly innovative one. After each improvement or new development of telecommunication and network protocols, manufacturers and operators of telecommunication and network apparatuses face a problem of function and conformance testing new plants. For competition reasons the manufacturers are anxious to launch their products into the market as early as possible. The high pace of these developments places special demands on the manufacturers of protocol systems. To keep test times for the new plants as short as possible and to burden test personnel with as little protocol knowledge as possible, the manufacturers often use protocol emulations on protocol test systems. In actual practice emulations of a protocol are frequently prepared by having each of the emulations reproduce individual protocol layers. In this way it is possible to reproduce entire protocol stacks or selected parts of a protocol stack by joining the individual protocol layers to form an emulation system. The individual protocol layers are viewed abstractly and in this way pass on data from layer to layer. Specifications of protocols usually use so-called primitives to describe the communication between the protocol layers. In this connection reference is made to the ISO OSI (International Standard Organization's Open System Interconnect) reference model, which is hereby incorporated by reference.

FIG. 1 shows for clarification the bottom part of a protocol stack with emulation layers E1, E2 and E3 where the bottom-most emulation layer E1 is connected to a physical layer PL. To test a certain protocol layer according to the prior art (FIG. 2), the relevant emulation layer is newly programmed with respect to the new test task. In FIG. 2 the second layer therefore is replaced by a test layer TL to test emulation layer E2. This involves a considerable programming effort, because the entire procedural sequence of the relevant protocol layer has to be intercepted in the test layer, which is reflected in a correspondingly high implementation and maintenance effort. This programming effort must be repeated to test another layer of the protocol stack. In the prior art the test layer has to be programmed such that on the one hand it fulfils the task and on the other it also exhibits all functionalities exhibited by the emulation layer E2. Moreover for each new measurement task of the relevant protocol layer, the test layer TL needs to be reprogrammed accordingly. In the case of the test layer TL the programming of the emulation layer is therefore not distinguished sufficiently from the programming of the measurement task—both parts are rather more intertwined in respect of simple, clear programming. Yet separate programming of the two parts in the prior art is not required because the test layer replaces the relevant emulation layer regardless of the type of programming. What is essential in the prior art is that the test layer realizes both basic functions, i.e., the functions of the emulation layer and the functions of the measurement task.

For further details on the prior art reference is made as follows:

From U.S. Published patent application No. 20030172342 there is shown a system and method that identifies the limits of an Upper Layer Protocol (ULP). However it does not relate to the message flow and interactions with other components.

From U.S. Published patent application No. 20030086536 there is shown a method for testing one or several OSSs (Operations Support Systems) of an ILEC (Incumbent Local Exchange Carrier). In this connection several actions are performed which, with the implementation of a test schedule, serve to test one or several ILEC OSS elements.

From U.S. Published patent application No. 20030014611 there is shown a development tool that supports the implementation of software for a DSP (Digital Signal Processor). A similar disclosure can be found in U.S. Published patent application No. 20030004697.

In U.S. Published patent application No. 20020191543 parameters are identified in a packet of data flows to test whether the relevant parameter value complies with specific requirements. However the discussion is limited to the bandwidth aspect and hence isolated from the message flow itself.

U.S. Published patent application No. 20020162059 deals with a test system for communication networks which allows autonomous or user-free interaction between the administrative interfaces of different network appliances to be tested. The test system has appliance-specific packets for communication interfaces, which serve to convert general commands into appliance-specific commands.

U.S. Pat. No. 6,661,780 provides mechanisms for mapping rules concerning the QoS (Quality of Service) in a mobile network between a UMTS (Universal Mobile Telecommunications System) layer and an IP (Internet Protocol) layer.

U.S. Pat. No. 6,512,988 relates to a test management system that may be used for processing test cases. However it does not describe implementation methods of test cases.

From U.S. Pat. No. 6,363,053 there is known a method for testing the QoS of a network. It involves the use of the classic approach in which a test component simulates or emulates a node element.

What is desired is to further develop a generic protocol tester or a generic method such that much lower work and time effort is required for the programmer in preparing a test case.

BRIEF SUMMARY OF THE INVENTION

Accordingly the present invention provides a method of performing and implementing a test case by having a test layer be the emulation of a layer to be tested, which is available anyway, and inserting a complementary layer to take account of the real measurement task. This way the programming effort is reduced to what is the real test-relevant part—the test task. Thus, by skilful programming of the complementary layer and suitable insertion into the protocol stack, a fast, simple and clearly arranged implementation of a test task is realized. While in prior art the programming of the test layer TL in one embodiment covered four program pages, the complementary layer employed according to the present invention has only one line for implementing the same test task. The complementary layer preferably is inserted into the protocol stack between a specific protocol layer and a lower-level layer, it being possible for the lower-level layer to be a protocol layer or the physical layer. This provides the opportunity to scan data in respect of the test task so that data, which are irrelevant for the test task, are passed on in a transparent manner. For irrelevant data the specific protocol layer—the emulation layer that already exists—is therefore effective. The complementary layer is thus designed to transparently pass on the data that are irrelevant for the test task, while data that are relevant for the test task are modified and/or generated and/or triggered and/or processed further and/or analyzed as necessary for performing the test task. The protocol layers of the protocol stack, especially the specific protocol layer, preferably correspond to standard emulation layers that, although programmed only once, are used in the most different of functions.

The objects, advantages and other novel features of the present invention are apparent from the following detailed description when read in light of the claims and appended drawing.

BRIEF DESCRIPTION OF THE SEVERAL VIEWS OF THE DRAWING

FIG. 5 is a plan view of a message sequence chart for implementing the test task based on use according to the present invention.

DETAILED DESCRIPTION OF THE INVENTION

Figure 1:
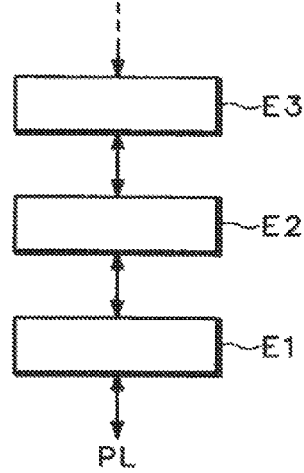
FIG. 1 a diagrammatic view of a protocol stack having several emulation layers as is known in the prior art.
Figure 2:
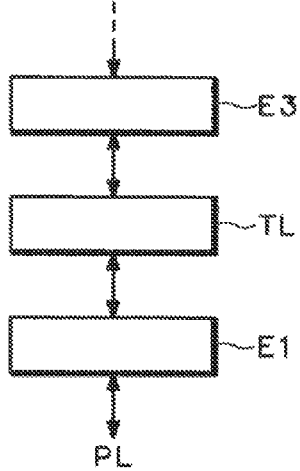
FIG. 2 is a flow diagram view of a prior art method for implementing a test task on the protocol stack of FIG. 1.
Figure 3:
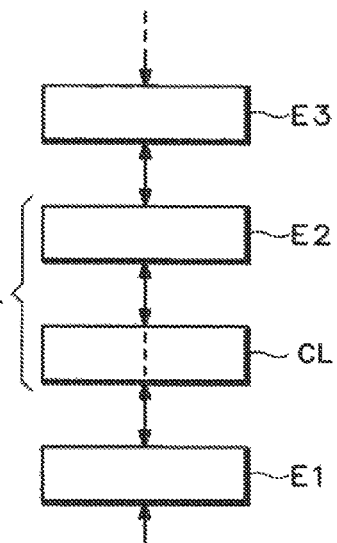
FIG. 3 is a flow diagram view of a method for performing and implementing a test task according to the present invention.
Figure 4:
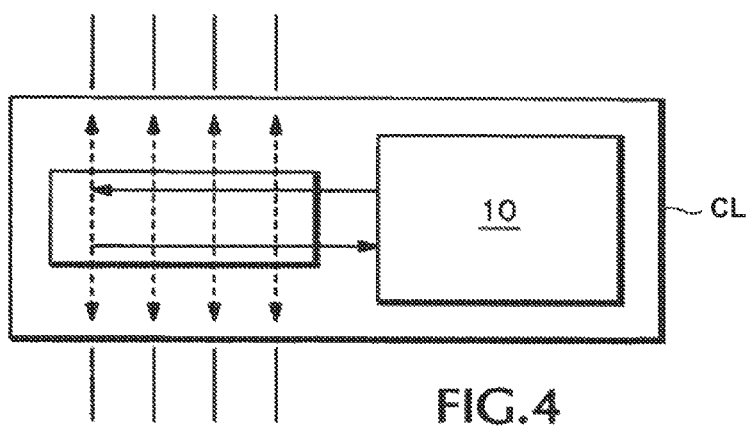
FIG. 4 is a schematic view of a complementary layer with regard to actions to be performed according to the present invention.

Referring now to FIG. 3 the implementation of a test task on a protocol stack is shown. There is inserted between a protocol layer E2 to be tested, which is designed as a standard emulation layer, and an emulation layer E1 below it, a complementary layer CL that together with the emulation layer E2 replaces the test layer TL of the prior art (FIG. 2). According to FIG. 4 there are scanned by a processing unit 10 in the complementary layer CL the primitives exchanged between the emulation layers E1 and E2, especially their Service Access Points (SAPs). In this process data that are irrelevant for the test task are passed on transparently as shown by the dashed arrows, while data that are relevant for the test task are modified and/or generated and/or triggered and/or processed further and/or analyzed as necessary for performing the test task.

FIG. 5 shows the implementation using as an example the standardized language MSC (Message Sequence Charts) that serves to graphically display a communication sequence between two or more instances. In this connection reference is made to U.S. Published patent application No. 2001015732, the disclosed contents of which are hereby incorporated by reference and which explain how a communication sequence shown graphically between two or more instances using the standardised language MSC is converted into an executable version of a communication sequence. Details on MSC can furthermore be taken from ITU-T (International Telecommunication Union—Telecom standard) Z.120, which is hereby incorporated by reference. A simplification of the solution to the problem described in U.S. Published patent application No. 2001015732 is taken from U.S. Published patent application No. 2004048636, the contents of which are hereby incorporated by reference. According to FIG. 5 the communication exhibits two instances IUT (Item Under Test) where the left (RANAP—Radio Access Network Application Protocol) represents, as an example, the layer to be tested while the right (NNISCCP—an emulation of the Signaling Connection Control Part (SCCP) protocol) represents the layer arranged under the layer to be tested. Between the two instances IUT there is arranged an instance TC (Test Component) which represents the complementary layer CL. In the present example a protocol tester is to test an RNC (Radio Network Controller) which, once a connection to a core network has been established, is in an appropriate status of connection to initiate a procedure "Common ID" where it has received a "Common ID" message that contains an unknown information element. This is expressed in that the complementary layer CL (the time progresses downwards along the vertical line) sends the message SCC_N_DATA_IND_COMMON_ID_unknown_IE_R. Thereafter a one-second timer is set (T_AC(1000 ms)). If within this time there is received from the complementary layer CL via the bottom layer the message "Error Indication", according to which the unknown information element is rejected (TX: SCCP_N_DATA_REQ_ERROR_IND_S), the behaviour is regarded as being in conformity with the standard—the test has been completed successfully (P=Passed). The timer is reset. If, as can be seen from the bottom part of the drawing, no desired error message has been received from the opposite side after the timer has expired, the test is considered to have failed (F=Failed). The standard RANAP emulation layer has no error treatment implemented as a standard, so this test case is completely handled by the complementary layer CL. The remaining message flow, however, remains within the responsibility of the RANAP emulation layer.

In the present case an implementation according to the prior art would have meant an extra effort by at least a factor of 10. Generally the extra effort is dependent on the complexity of the protocol stack and the protocol layer to be tested.

As another example, if an apparatus to be tested contains a customer-specific peculiarity or enlargement of the standard, the performance of a test, if conducted according to the prior art, would be prevented by a non-standard event. In the present case special cases of this kind are taken into account within a few seconds. Thereafter a test is performed without any problems.

Thus the present invention provides a method for performing and implementing a test task for a specific protocol layer in a protocol stack by inserting a complementary layer between the specified protocol layer and a next lower protocol layer which intercepts data between the layers, passing irrelevant data on between the layers transparently while processing the data relevant to the test task specified by the complementary layer.

What is claimed is:

1. A protocol tester for performing a test task relating to a specific protocol layer of a protocol stack in an apparatus to be tested, the specific protocol layer being superordinated to a higher-level protocol layer as a next higher protocol layer and being subordinated to a lower-level layer as a next lower layer, the protocol tester inserting between the higher-level protocol layer and the lower-level layer a test layer into the protocol stack wherein the test layer comprises the specific protocol layer and a complementary layer.

2. The protocol tester according to claim 1 wherein the lower-level layer comprises a layer selected from the group consisting of a protocol layer and a physical layer.

3. The protocol tester according to claim 1 or 2 wherein the complementary layer is inserted between the specific protocol layer and the lower-level layer.

4. The protocol tester according to claim 3 wherein the complementary layer comprises means for defining the test task.

5. The protocol tester according to claim 4 wherein the complementary layer comprises means for scanning with respect to the test task data transmitted in reverse between the lower-level layer and the specific protocol layer, data not relevant for the test task being transmitted in a transparent manner.

6. The protocol tester according to claim 5 wherein the complementary layer means for processing from the data transmitted in reverse between the lower-level layer and the specific protocol layer data relevant for the test task.

7. The protocol tester according to claim 1 wherein the protocol layers of the protocol stack, especially the specific protocol layer, correspond to standard emulation layers.

8. A method of implementing a test task in a protocol tester relating to a specific protocol layer of a protocol stack for an apparatus to be tested, the specific protocol layer being superordinated to a higher-level protocol layer as a next higher protocol layer and being subordinated to a lower-level layer as a next lower layer, the protocol tester inserting between the higher-level protocol layer and the lower-level layer a test layer into the protocol stack where the test layer in the protocol tester has the specific protocol layer and a complementary layer, further comprising the step of defining the test task in the complementary layer.

9. The method of claim 8, wherein the lower-level layer comprises a layer selected from the group consisting of a protocol layer and a physical layer.

10. The method of claim 8, wherein the complementary layer is inserted between the specific protocol layer and the lower-level layer.

11. The method of claim 10, further comprising:
defining the test task in the complementary layer.

12. The method of claim 11, further comprising:
scanning within the complementary layer for test task data transmitted between the lower-level layer and the specific protocol layer; and
transmitting data not relevant for the test task in a transparent manner.

13. The method of claim 10, further comprising:
processing within the complementary layer data transmitted between the lower-level layer and the specific protocol layer data relevant for the test task.

14. The method of claim 8, wherein the protocol layers of the protocol stack, especially the specific protocol layer, correspond to standard emulation layers.

15. A method for performing a test task using a protocol tester, the test task relating to a specific protocol layer of a protocol stack in an apparatus to be tested, wherein the specific protocol layer being located between a higher-level protocol layer and a lower-level layer as a next lower layer, the method comprising:
inserting a test layer between the higher-level protocol layer and the lower-level layer using the protocol tester, the test layer comprising the specific protocol layer and a complementary layer; and
defining the test task in the complementary layer using the protocol tester.

16. The method of claim 15, further comprising:
scanning, in a processing unit of the protocol tester, the primitives in the complementary layer exchanged between the higher-level protocol layer and the lower-level layer.

17. The method of claim 15, wherein the primitives comprise Service Access Points (SAP).

18. The method of claim 15, further comprising:
identifying data in the primitives that is irrelevant to the test task; and
passing the irrelevant data between the higher-level protocol layer and the lower-level layer without further modification.

19. The method of claim 15, further comprising:
identifying data in the primitives that is relevant to the test task; and
modifying the relevant data to support the test task.

20. The method of claim 15, further comprising:
graphically displaying a communication sequence, the communication sequence comprising a test task implemented in a complementary layer.

* * * * *